(12) United States Patent
Lawall et al.

(10) Patent No.: US 7,909,403 B2
(45) Date of Patent: Mar. 22, 2011

(54) MANIPULABLE SEAT BOLSTER UTILIZING ACTIVE MATERIAL ACTUATION

(75) Inventors: Jennifer P. Lawall, Waterford, MI (US); Steven E. Morris, Fair Haven, MI (US); Diane K. McQueen, Leonard, MI (US); Nancy L. Johnson, Northville, MI (US); Alan L. Browne, Grosse Pointe, MI (US); Paul W. Alexander, Ypsilanti, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 12/392,100

(22) Filed: Feb. 24, 2009

(65) Prior Publication Data

US 2009/0218858 A1 Sep. 3, 2009

Related U.S. Application Data

(60) Provisional application No. 61/033,088, filed on Mar. 3, 2008.

(51) Int. Cl.
*B60N 2/42* (2006.01)
(52) U.S. Cl. .................................. 297/284.9; 296/68
(58) Field of Classification Search .... 297/284.1–284.9; 296/68
See application file for complete search history.

(56) References Cited

U.S. PATENT DOCUMENTS

| | | | |
|---|---|---|---|
| 6,129,419 A | 10/2000 | Neale | |
| 6,739,657 B2 * | 5/2004 | Heilig et al. | 297/216.1 |
| 6,910,714 B2 * | 6/2005 | Browne et al. | 280/753 |
| 7,108,316 B2 * | 9/2006 | Barvosa-Carter et al. | 296/187.05 |
| 7,140,478 B2 * | 11/2006 | Barvosa-Carter et al. | 188/267 |
| 7,309,104 B2 * | 12/2007 | Browne et al. | 297/284.1 |
| 7,322,652 B1 | 1/2008 | Tache | |
| 2005/0217767 A1 * | 10/2005 | Barvosa-Carter et al. | 148/563 |
| 2007/0246285 A1 * | 10/2007 | Browne et al. | 180/273 |

* cited by examiner

*Primary Examiner* — Dennis H Pedder (57) ABSTRACT

A manipulable seat bolster including an active material actuator configured to selectively cause or enable a condition, such as the geometric configuration, or position of the bolster to be modified, when the active material is activated.

11 Claims, 7 Drawing Sheets

MANIPULABLE SEAT BOLSTER UTILIZING ACTIVE MATERIAL ACTUATION

RELATED APPLICATIONS

This patent application makes reference to, claims priority to, and claims benefit from U.S. Provisional Patent Application Ser. No. 61/033,088, entitled "ACTIVE MATERIAL ACTUATED SEAT BOLSTER," filed on Mar. 3, 2008.

BACKGROUND OF THE INVENTION

1. Field of the Invention

The present disclosure generally relates to seat bolsters, and more particularly, to a manipulable seat bolster that utilizes active material actuation to effect or enable a change in at least one condition defined by the bolster.

2. Discussion of Prior Art

Figure 1:
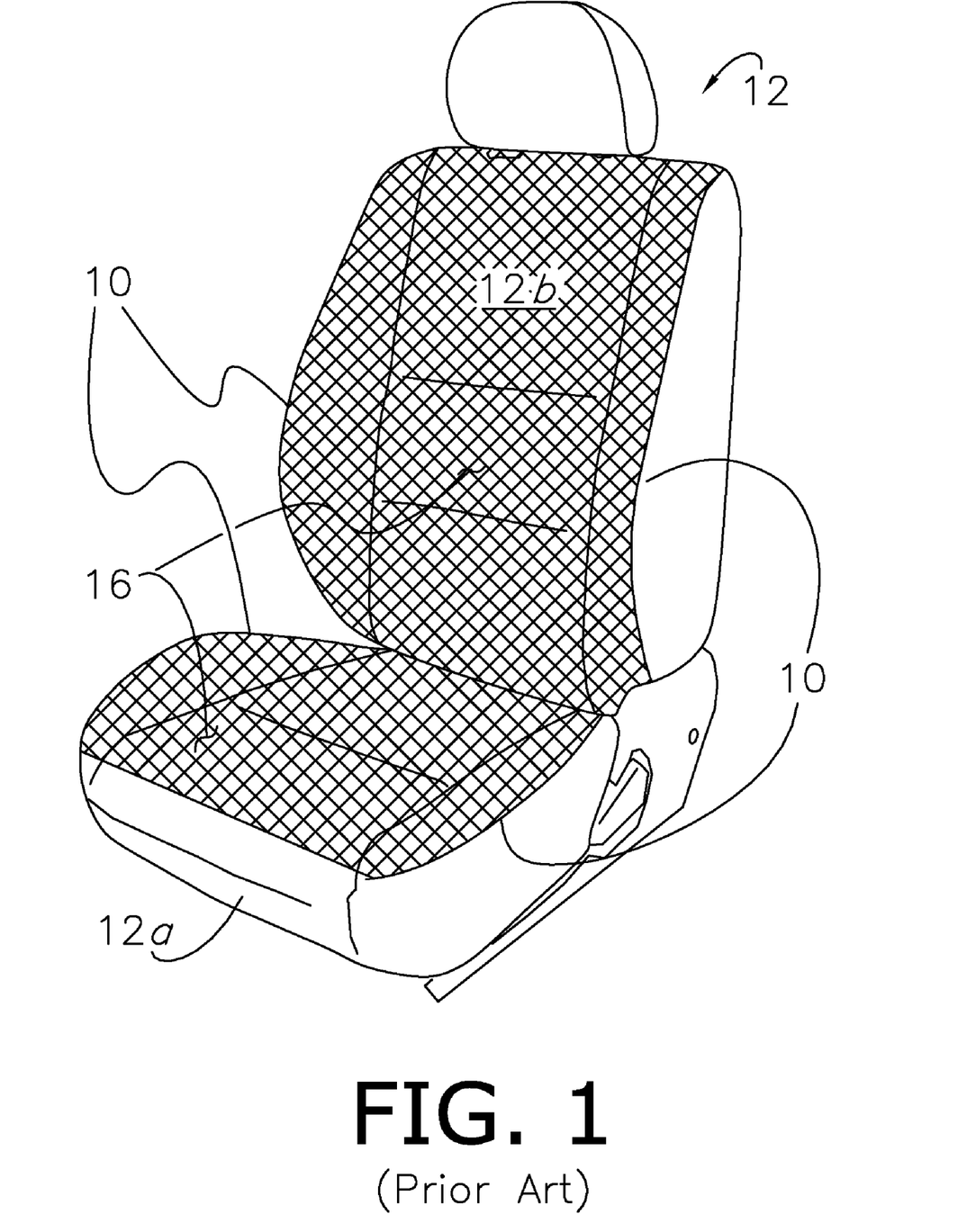
FIG. 1 is a perspective view of a prior art automotive seat having non-adjustable base and upright bolsters.

Conventional seat bolsters typically present fixed wings or outer portions of the base or upright that conform towards the occupant, so as to form a cradle-like configuration (FIG. 1). In an automotive setting, for example, these features are employed to provide lateral support to occupants during lateral acceleration. In addition to functionality, however, these features also present various concerns in the art, including one-size-fits-all configurations, which do not take into account the body size, or preference of the occupant. Of further concern, it is appreciated that seat bolsters, as a result of repetitive engagement (e.g., sliding, brushing, etc.) by occupants entering and exiting the seat, often exhibit accelerated wear and tear. As a result, increases in damage to the exterior surface (e.g., protective leather covering) and the repair/maintenance costs associated therewith are typically appreciated.

BRIEF SUMMARY OF THE INVENTION

In response to the afore-mentioned concerns, the present invention recites a manipulable bolster that utilizes active material actuation to effect or enable motion. The invention is useful for providing an adjustable seat bolster that can be modified to better accommodate occupant size and/or preference. In an automotive setting, the invention is further useful for improving occupant kinematics during a side-impact or for increasing the versatility of vehicle seating. In a dual mode setting, a first bolster configuration (e.g., towards the occupant) may provide, for example, a sport or bucket seat feeling, while in the second position (e.g., away from the occupant) a more cruising family feel is provided.

The inventive bolster advantageously utilizes active material actuation, which improves energy efficiency, and reduces weight, complexity, the likelihood of failure, and noise (both acoustically and with respect to EMF) in comparison to counterpart mechanical, electro-mechanical, hydraulic, or pneumatic based systems.

Generally provided is a manipulable seat bolster adapted for use with a seat defining an exterior surface. In a preferred embodiment, the bolster includes structure housed within the seat, and secured at a first position spaced from the surface a first distance. An actuator is drivenly coupled to the structure, and includes an active material element. A signal source is operable to generate and deliver an activation signal to the element, so as to power the bolster. The actuator is configured to move the structure to a second position spaced from the surface a second distance different from the first, when the material element is activated. More preferably, the actuator is configured to move the structure to one of a plurality of possible second positions, through, for example, use of multiple active material elements or a locking mechanism presenting multiple stops.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

The following description of the preferred embodiments is merely exemplary in nature and is in no way intended to limit the invention, its application, or uses. The invention is described and illustrated with respect to an automotive seat bolster 10 (FIGS. 1 and 2); however, it is well appreciated that the benefits thereof may be utilized variously with other types of seats (or furniture), including reclining sofas, airplane seats, and child seats. The invention general recites a manipulable bolster 10 adapted for use with a seat 12 comprising a base 12a configured to support the posterior of an occupant (not shown) and an upright 12b configured to support the back of the occupant. The bolster 10 is drivenly coupled to, so as to be causable to change in at least one condition (e.g., geometric configuration, orientation, stiffness, etc.) by, an active material element 14.

I. Active Material Description and Functionality

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to an activation signal.

Active materials include, without limitation, shape memory alloys (SMA), ferromagnetic shape memory alloys, electroactive polymers (EAP), piezoelectric materials, magnetorheological elastomers, electrorheological elastomers, high-output-paraffin (HOP) wax actuators, and the like. Depending on the particular active material, the activation signal can take the form of, without limitation, heat energy, an electric current, an electric field (voltage), a temperature change, a magnetic field, a mechanical loading or stressing, and the like, with the particular activation signal dependent on the materials and/or configuration of the active material. For example, a magnetic field may be applied for changing the property of the active material fabricated from magnetostrictive materials. A heat signal may be applied for changing the property of thermally activated active materials such as SMA. An electrical signal may be applied for changing the property of the active material fabricated from electroactive materials and piezoelectrics (PZT's).

Active materials especially suited for use with the present invention include but are not limited to shape memory alloys, ferromagnetic shape memory alloys, and other active materials, such as electroactive polymers (EAP), that can function as actuators under fibrous configurations and atmospheric conditions. These types of active materials have the ability to remember their original shape and/or elastic modulus, which can subsequently be recalled by applying an external stimulus. As such, deformation from the original shape is a temporary condition. In this manner, an element composed of these materials can change to the trained shape in response to an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Thus, as further described below, materials that exhibit shape memory effect only upon heating are referred to as having one-way shape memory; and those that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Stress induced phase changes in SMA, caused by loading and unloading, are, however, two way by nature. That is to say, application of sufficient stress when an SMA is in its austenitic phase will cause it to change to its lower modulus martensitic phase in which it can exhibit up to 8% of "superelastic" deformation. Removal of the applied stress will cause the SMA to switch back to its austenitic phase in so doing recovering its starting shape and higher modulus.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications. Electric current running through the coil induces a magnetic field through the FSMA material, causing a change in shape. Alternatively, a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has a maximum elastic modulus of about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof. It is appreciated that piezoelectric ceramics are also particularly applicable to the present invention.

Finally, suitable magnetorheological elastomers, for example to change the stiffness of the bolster, may include an elastic polymer matrix comprising a suspension of ferromagnetic or paramagnetic particles, wherein the particles are described above. The polymer matrices include, but are not limited to, poly-alpha-olefins, natural rubber, silicone, polybutadiene, polyethylene, polyisoprene, and the like.

II. Exemplary Active Bolster Configurations, Applications, and Use

With reference to FIGS. 2-12, exemplary embodiments of the active seat bolster 10 are adapted for use with an automotive seat 12 that defines an exterior surface 16. The illustrated bolster 10 includes an internal actuator 18 operable to autonomously change a condition, such as the geometric configuration, of the surface 16.

More particularly, the bolster 10 includes a moveable or reconfigurable structure 20 disposed therein. The structure 20 is preferably enveloped, for example, by a cushion layer 22 of the seat 12 so as to maintain occupant comfort. In the illustrated embodiment, the structure 12 is moveable (e.g., linearly moveable, pivotal, shiftable, reconfigurable, etc.) between first and second positions (e.g., shapes, configurations, orientations, etc.) relative to the surface 16, wherein each of the positions causes the surface 16 to present a different geometric configuration (e.g., FIG. 2b).

Figures 2, 2A, 2B:
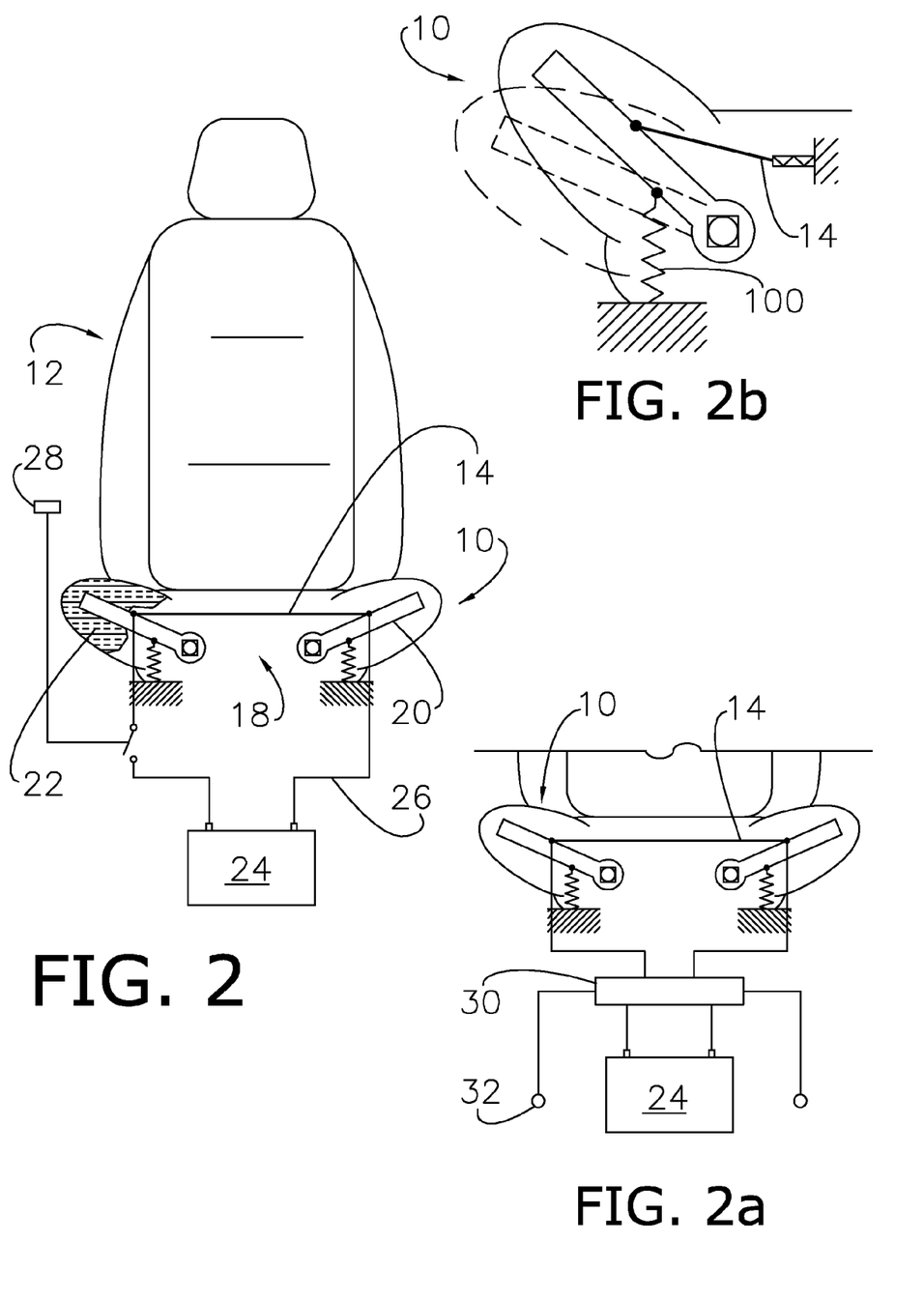
FIG. 2 is a front elevation of an automotive seat having manipulable lateral bolsters, and shown internally, a system adapted to change the geometric configuration of the bolsters comprising an active material actuator, return springs, a signal source connected to the actuator, and an input device communicatively coupled to the actuator and source, in accordance with a preferred embodiment of the invention.
FIG. 2a is a partial elevation of the seat shown in FIG. 2, wherein a plurality of sensors and a controller replace the input device and are communicatively coupled to the source and actuator, in accordance with a preferred embodiment of the invention.
FIG. 2b is an elevation of the bolster shown in FIG. 2, particularly illustrating the bolster in concave (solid-line type) and flattened (hidden-line type) positions, in response to the actuator being activated and deactivated respectively.
Figure 3A:
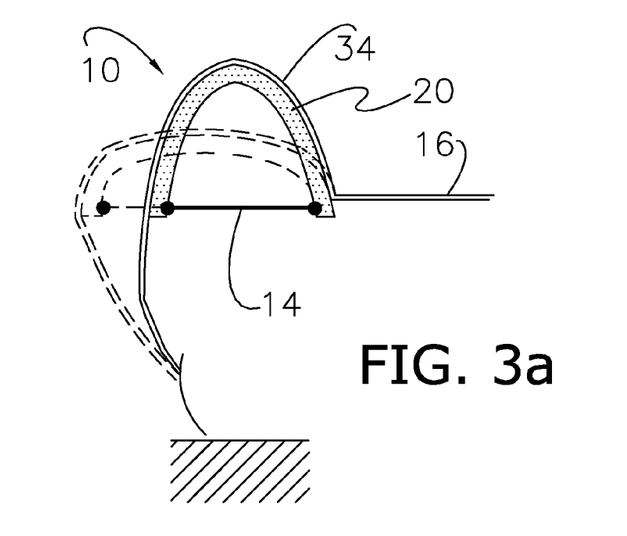
FIG. 3a is a front elevation of an adjustable bolster including a flexible panel structure presenting an upwardly bowed configuration, and wire actuating element connected to the panel so as to form a chord therewith, wherein the panel and bolster present a first flattened position when the element is deactivated (hidden-line type) and a raised position, when the element is activated (solid-line type), in accordance with a preferred embodiment of the invention.

For example, the first position may be such that the structure 20 is caused to bear upward upon the surface 16, thereby causing the bolster 10 to move upward (FIGS. 2b, and 3a,b). In this configuration, it is appreciated that first and second lateral bolsters 10 (FIGS. 1 and 2) will form a more concave (or cradle-like) configuration, which provides more lateral support to the occupant. The second position causes the structure 20 to bear downward upon the bolster 10, so as to cause the surface 16 to flatten (FIG. 2b). This, it is appreciated, reduces engagement with the occupant upon entering and exiting the seat 12. As further described below, the preferred bolster 10 is selectively able to achieve either the first or second position (FIG. 2b), on demand.

More preferably, the bolster 10 is able to achieve a greater plurality of positions. For example, in an automotive setting, the inventive bolster 10 may be configured to achieve the afore-mentioned "flattened" orientation for entry and egress (it is appreciated that only the outboard bolster may be separately manipulated in this regard), a second slightly tilted upward orientation for normal driving, a third orientation tilted higher than the second for performance driving, a fourth orientation tilted higher than the third for high lateral acceleration, and finally, a fifth generally vertical orientation for side impact protection. In the later case, it is appreciated that impact configuration could be achieved, for example, by just the release of a pin (not shown) and then manually reset.

As previously mentioned, the actuator 18 is drivenly coupled to the structure 20, and includes an active material element 14 operable to undergo a reversible change in fundamental property when exposed to or occluded from an activation signal. That is to say, the actuator 18 is configured to cause or enable the structure 20 to move to one of the positions, when the element 14 is activated; and to that end, the element 14 may be configured to directly or indirectly drive manipulation. It is appreciated that the element 14 may be used to drive the bolster 10 either towards the first or second position.

To that end, a signal source 24 (e.g., power supply) is communicatively coupled to the element 14 and operable to generate the activation signal, so as to activate the element. In an automotive setting, for example, the source 24 may consist of the charging system of a vehicle, including the battery (FIG. 2), and the element 14 may be interconnected thereto, through leads 26, or through suitable short-range wireless communication (e.g., RF, infrared, etc.). A switch or otherwise input device 28 with an electrical interface to the shape memory alloy element 14 may be used to close the circuit between the source and element 14 so as to provide on-demand control of the bolster 10.

Alternatively, the switch 28 may be replaced or supplemented by a controller 30 and at least one sensor 32 communicatively coupled to the controller. The controller 30 and sensor(s) 32 are cooperatively configured to selectively cause actuation when a pre-determined condition is detected (FIG. 2b). In an automotive setting, for example, a sensor 32 may be employed that indicates when the vehicle door adjacent to the seating position is open; the controller 30 causes the bolster 10 to actuate (rotate to and remain in a more horizontal position) only when this event is determined. As a second example, at least one crash, and more preferably, side-impact crash sensor 32 may be employed, such that the controller 30 is able to detect actual and/or predict imminent crash events; the controller 30 causes the bolster 10 to actuate only when an event is determined.

In yet another example, the sensor 32 and/or controller 30 (e.g., through the aid of a GPS/map database system) may be cooperatively configured to anticipate or determine the presence of a minimum yaw or lateral acceleration rate of the vehicle. In this configuration, the controller 30 is configured to autonomously adjust the bolsters 10 towards a more concave or "sporty" position when the rate exceeds a minimum threshold. At least one load cell sensor 32 may be utilized in association with the seat base 12a. In this configuration, the load cell 32 is operably positioned relative to the surface 16, so as to be able to detect a minimum force (e.g., the weight of the average child occupant, larger sidewise g-loads due to turning, etc.) placed thereupon. The bolster 10 may be autonomously manipulated upon application and/or removal of the force. Finally, it is appreciated that the bolster 10 may be programmably configured to effect memory recall, wherein the input device 28 and controller 30 cooperate to cause the actuator 18 to achieve one of a plurality of positions stored in an internal memory. It is appreciated that suitable algorithms, processing capability, and sensor inputs are well within the skill of those in the art in view of this disclosure.

Returning to the structural configuration of the invention, FIGS. 3a-e present various embodiments wherein the shape of the structure 20 is reconfigured to effect a change in bolster height. A first embodiment is shown in FIG. 3a, wherein the structure 20 presents a resistively flexible panel defining an arcuate lateral cross-section that is bowed upward. The panel structure 20 forms generally superjacent layers with, so as to directly engage, at least a portion of the surface 16 (e.g., the portion of the surface 16 formed by the bolsters 10).

The actuator 18 consists of at least one active material element 14, such as an SMA wire, that is connected to the panel structure 20, at or near each end of the arcuate profile, so as to form a chord (FIG. 3a). As used herein, the term "wire" is not limited to a singular form, and further includes other geometric forms such as bundles, strips, braids, cables, weaves, etc. More preferably, for tailored force and incremental displacement performance, the actuator 18 includes a plurality of active material elements (such as SMA wires, and EAP tendons or roll actuators) 14 configured electrically or mechanically in series or parallel, and mechanically connected in telescoping, stacked, or staggered configurations. That is to say, a plurality of elements 14 may present a plurality of differing activatable subsets, wherein each subset is configured to cause the structure 20 to move to a different one of achievable positions when activated. The electrical configuration may be modified during operation by software timing, circuitry timing, and external or actuation induced electrical contact.

More preferably, a plurality of elements 14 are likewise engaged with the structure 20 and offset longitudinally. The element(s) 14, and structure 20 are cooperatively configured and selected to present an operable relationship between the actuation force generated thereby and the flexure modulus of the structure 20. As shown in FIG. 3a, contraction of the element(s) 14 due to activation (or deactivation in the case of an EAP roll actuator), causes the height of the panel 20, and therefore the bolster 10 to increase, and the lateral span to draw inward. It is appreciated that in this configuration, the bolster 10 includes a flexible outer covering 34 that is able to conform to the differing shapes. When deactivated, the flexure modulus of the panel causes it and the bolster to return to the original shape.

Figure 3B:
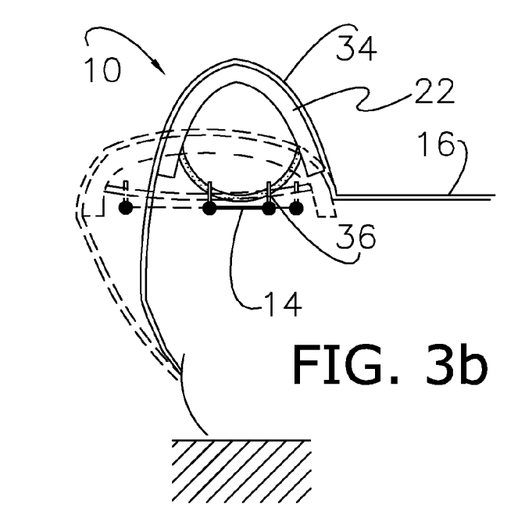
FIG. 3b is a front elevation of an adjustable bolster including a resistively flexible panel structure presenting a downwardly bowed configuration, first and second sliders entraining the structure, and a wire actuating element interconnecting the sliders, wherein the bolster presents a first flattened position when the element is deactivated (hidden-line type) and a raised position (solid-line type) when activated, in accordance with a preferred embodiment of the invention.

In a second example, the resistively flexible structure 20 may be bowed downward and entrained by first and second sliders 36 (FIG. 3b). At least one two-way memory SMA wire 14 or a concentrically aligned wire and compression spring may be used to interconnect the sliders 36, such that when the wire 14 is caused to contract, the sliders 36 are brought inward; but when deactivated, the sliders 36 return to their original positions. As shown in FIG. 3b, increased spacing between the sliders 36 directly correlates to a flatter structure profile and resultantly to a lower bolster height.

Figure 3C:
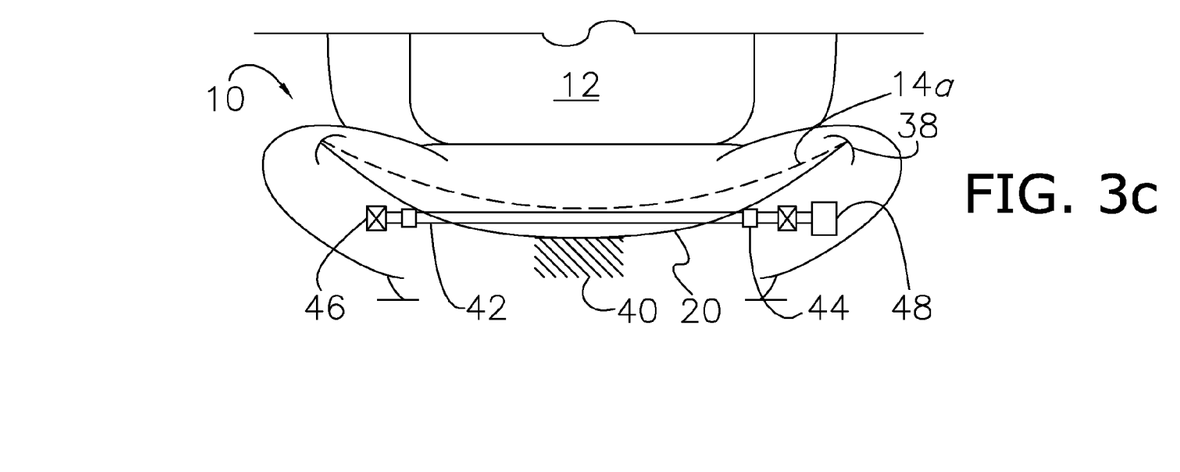
FIG. 3c is a front elevation of an adjustable bolster including a resistively flexible panel structure presenting a downwardly bowed configuration and co-extending with the base, and an SMA driven screw actuator having moveable pusher nuts that further bow the structure as they translate, in accordance with a preferred embodiment of the invention.

Alternatively, a single bowed structure 20 may span the seat base 12a or upright 12b, and be configured to simultaneously manipulate both lateral bolsters 10. In FIG. 3c, a bent sheet 20 having lateral bolster engaging shoes 38 is secured in a first position by a screw actuator 18 and medially anchored to the seat frame 40. More particularly, the actuator includes a screw rod 42, first and second pusher nuts 44, preferably at least one bearing 46 attached to the seat frame 40, and an active material (e.g., SMA) based drive 48. The drive 48 is configured to selectively cause the rod 42 to rotate when activated, and may employ spooled SMA, a plurality of synchronous PZT's, etc. The nuts 44 are externally disposed adjacent the sheet 20 where they present hard stops that prevent the sheet 20 from straightening. When rotated the rod 42 causes the nuts 44 to either inwardly or outwardly translate relative to the centerline of the base 12a. This causes the sheet 20 to further bow or straighten, and the bolsters 10 to raise or lower, respectively. Finally, it is appreciated that an auxiliary shaping element 14a may be used to supplement the screw actuator 18. For example, a second wire 14a, preferably of arcuate shape, may be interconnected to the sheet 20 at the shoes 38, as shown in FIG. 3c; such that contraction of the wire 14a causes the sheet 20 to further bow.

In a third reconfigurable embodiment, the bolsters 10 are defined by flexible strips 50. The strips 50 are coupled to the exterior rails 40a of the base or upright (FIG. 3d) frame, and to a lower sliding cross-bar 52 by two guides 54. The guides 54 entrain and slide along the rails 40a. At least one shape memory wire 14 interconnects a fixed cross-bar 40b and the sliding cross-bar 52. When activated, the wire 14 causes the sliding bar 52 to move towards the fixed cross-bar 40b. This action causes the strips 50 to further bow, such that the height of the bolster is increased. More preferably, the sliding bar 52 is biased towards a distal position relative to the fixed bar 40b, for example, by at least one extension spring connected thereto. It is appreciated that the bowed strips 50 also present spring action back towards the rested position. Upon deactivation, the sliding bar 52 is caused to return by the spring. More preferably the shoes 54 and rails 40a cooperatively define a friction or ball detent type lock operable to retain the strips 50 and bolsters 10 in the raised position, when the wire(s) 14 are deactivated. The strips 50 preferably present an elongated rectangular cross-section, so as to present a low bending modulus in the fore-aft direction, and a large bending modulus sideways.

Figures 3D, 3E, 4:
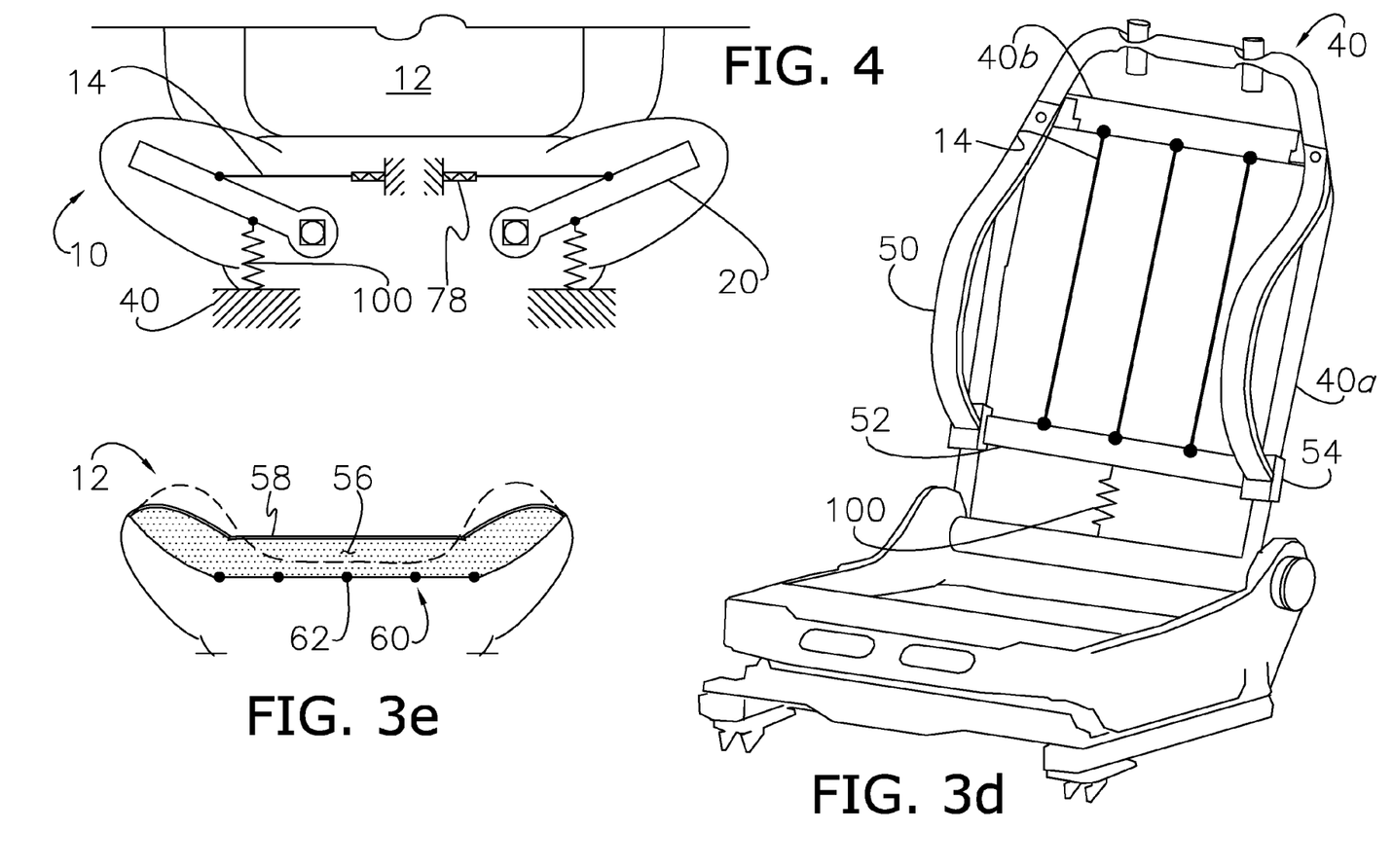
FIG. 3d is a perspective view of an adjustable bolster system coupled to a seat frame, wherein the system includes lateral strips entrained by shoes and interconnected by a sliding cross-bar at one end, a plurality of shape memory wires interconnecting the cross-bar to the frame such that activation causes the bar and shoes to translate upward and the strips to further bow, and a return spring connected to the bar, in accordance with a preferred embodiment of the invention.
FIG. 3e is a front elevation of an adjustable bolster including a layer of shape memory polymer material, a thermally insulative barrier, and a supporting/heating mesh underneath the layer, in accordance with a preferred embodiment of the invention.
FIG. 4 is a partial elevation of the seat shown in FIG. 2, wherein overload protectors have been added to protect plural elements, in accordance with a preferred embodiment of the invention.

Finally, another reconfigurable embodiment is contemplated, wherein the structure 20 and element 14 are functionally combined. That is to say, a suitable, active material, such as SMP, may be utilized to construct the structure 20, such that activation of the structure/element enables the bolster 10 to be manually reconfigured (e.g., to a customized preference), and subsequent deactivation functions to permanently set the new configuration. Here, it is further appreciated that reactivation, with no external loading upon the seat, will cause the structure 20 to return to its stress equilibrium original shape. In FIG. 3e, for example, a layer 56 of SMP material co-extending with the surface 16 and thermally isolated from the occupant by a protective barrier 58 is provided. When activated the layer 56 is able to be reconfigured, e.g., by the weight of the occupant, such that SMP material is caused to flow away from the central region of the layer 56 and into the bolsters 10. The layer 56 may be supported by a mesh support or wire frame 60 preferably comprising offset heating elements 62, as shown. It is appreciated that heat may be dissipated through interaction with ambient air conditions, a seat cooler (not shown), or the HVAC unit (also not shown) of the vehicle.

In other embodiments (e.g., FIGS. 2 and 4-11), the structure 20 defines a pivot or rotation axis about which the bolster 10 pivots up and down when actuated, and as such, forms a swing arm. Here, the actuator 18 may consist essentially of at least one SMA wire 14 fixedly interconnecting the swing arms 20 to each other (FIG. 2), or individually to the frame, as shown in FIG. 4 (preferably within the seat, so as to be self-containing).

In FIGS. 2 and 4, the wire 14 connects to the top surface of the arm 20 and extends horizontally above the axis, so as to cause the arm 20 to swing upward towards the more concave position, when activated. Conversely, it is appreciated that the wire 14 may be attached to the bottom surface of the arm 20 and vertically oriented, so as to cause the arm 20 to swing downward towards the flatter position. Furthermore, it is appreciated that the wire 14 could be entrained by a pulley or contoured surface (not shown) in either of these configurations to tailor the actuation forces and displacements to a desired characteristic (i.e. decreasing the applied load as actuation progresses, etc.).

Figures 5A, 5B, 6:
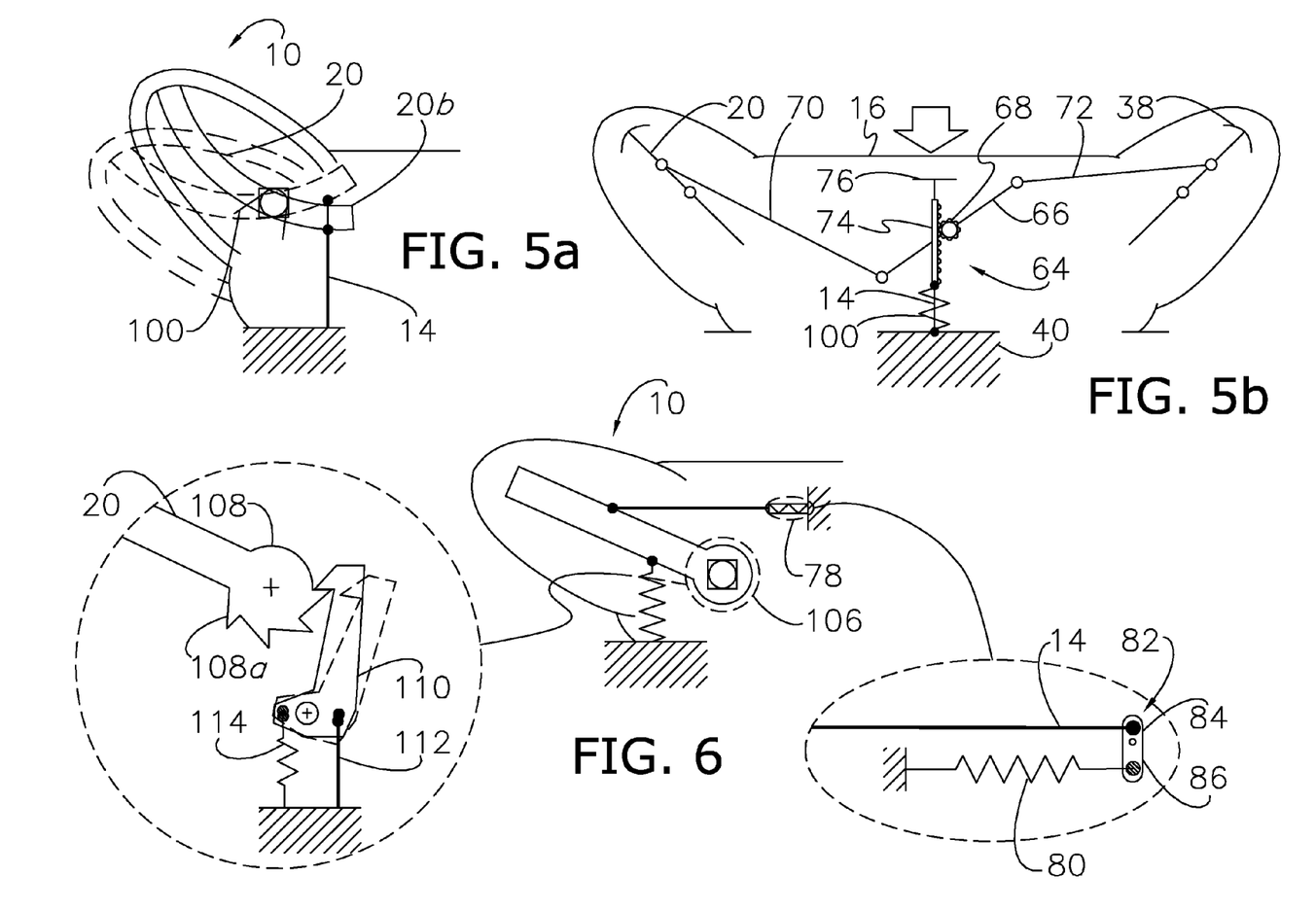
FIG. 5a is an elevation of an adjustable bolster including an arcuate shaped structure, and a vertically oriented wire actuating elements, shown in a deactivated and flattened condition (hidden-line type) and in a raised condition as a result of activation (solid-line type), in accordance with a preferred embodiment of the invention.
FIG. 5b is a front elevation of an adjustable bolster system including a rack and pinion transmission, a three-bar linkage mechanism interconnecting the transmission to first and second pivotal structures, and an SMA wire actuator augmentable by the resting load and drivenly coupled to the rack, in accordance with a preferred embodiment of the invention.
FIG. 6 is an elevation of the bolster shown in FIG. 4, particularly illustrating, in enlarged caption, a structure defining a pivot axis, an overload protector for the element, and a locking mechanism comprising a gear, pawl, and second active material element, in accordance with a preferred embodiment of the invention.

It is also within the ambit of the invention for the wire 14 and structure 20 to be cooperatively configured, such that the wire 14 extends vertically towards a fixed support, while effective to drive the bolster 10 towards a raised position. In FIGS. 5a-b, for example, the structure 20 presents an arcuate lateral cross-section and an interior pivot axis, so as to define an actuator engaging portion 20b. An SMA wire 14 is connected to the structure 20 near the inner edge and to the frame 40. When activated, the SMA wire 14 contracts causing the distal edge of the structure 20 to rotate upward. It is appreciated that the actuator 18 can be further configured to augment the work performed by the wire 14 with the resting load of the occupant. For example, the structure 20 may define an elongated engaging portion 20b that extends towards the centerline of the seat 12. Here, it is appreciated that the load and material activation cooperatively work to achieve the final displacement of the structure 20. Finally, as shown in FIG. 5a, a torsion spring concentrically aligned with the pivot axis and presenting a spring modulus less than the load and/or actuation force may be used to provide a return.

More preferably, the bolsters 10 may be drivenly coupled such that they are simultaneously manipulated. For example, and as shown in FIG. 5b, a set of lateral bolsters 10 may be drivenly coupled by a vertical rack and pinion transmission 64 and a pivotal three-bar linkage mechanism. Here, the middle bar 66 is fixedly connected to and passes through the center of the pinion 68, so as to congruently rotate therewith. First and second exterior bars 70,72 are pivotally coupled at the ends of the middle bar 66 and to the lateral structures 20 at congruent points above their pivot axes. The rack 74 presents a platform 76 at its upper end configured to facilitate receipt of the resting load, and engages a compression return spring buttressed by the seat frame 40 at its lower end to act as a return. At least one shape memory wire 14 is aligned with the spring and interconnects the rack 74 and frame 40. The rack 74 is lowered, and the pinion 68 and therefore the bolsters 10 are caused to rotate, when the wire(s) 14 is activated and/or the resting load is applied to the platform 76. When the load is removed and the wire deactivated, the compression spring releases its energy driving the rack and bolsters back to their resting positions. More preferably, at least one locking mechanism, configured to engage either the rack 74 or pinion 68, is provided to retain the bolsters 10 in the activated position, even when the wire(s) 14 is deactivated.

As shown in FIG. 6, the preferred actuator 18 further includes an overload protector 78 connected to each element 14 opposite the structure 20. The overload protector 78 is configured to present a secondary output path, when the element 14 is activated but the structure 20 is unable to be moved (e.g., is blocked by an object, such as the occupant). In the illustrated embodiment, the overload protector 78 includes an extension spring 80 connected in series to the wire 14. The spring 80 is stretched to a point where the applied preload corresponds to the load level where it is appreciated that the actuator wire 14 would begin to experience excessive force if blocked. As a result, activation of the wire 14 will first apply a force trying to manipulate the structure 20, but if the force level exceeds the preload in the spring 80 (e.g., the bolster 10 is blocked), the wire 14 will instead further stretch the spring 80, thereby preserving the integrity of the actuator 18.

More preferably, and also shown in FIG. 6, where connecting to the frame 40, the protector 78 further includes a lever 82 intermediate the element 14 and spring 80. The lever 82 defines first and second arms 84,86 and a pivot axis. The element 14 is attached to one of the arms 84,86, and is spaced from the axis a first distance. The spring 80 is attached to the other arm and spaced from the axis a second distance greater than the first, so as to provide mechanical advantage.

Figure 7A:
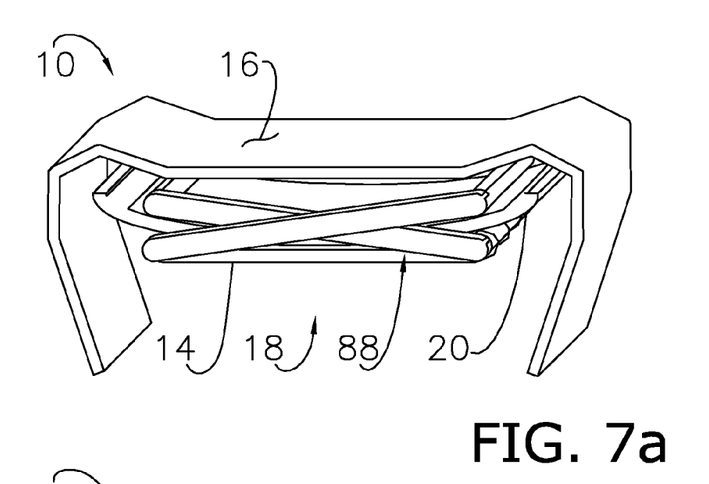
FIG. 7a is a perspective view of first and second adjustable lateral bolsters including an active material based actuator employing a scissor assembly, shown in a flattened and deactivated condition, in accordance with a preferred embodiment of the invention.
Figure 7B:
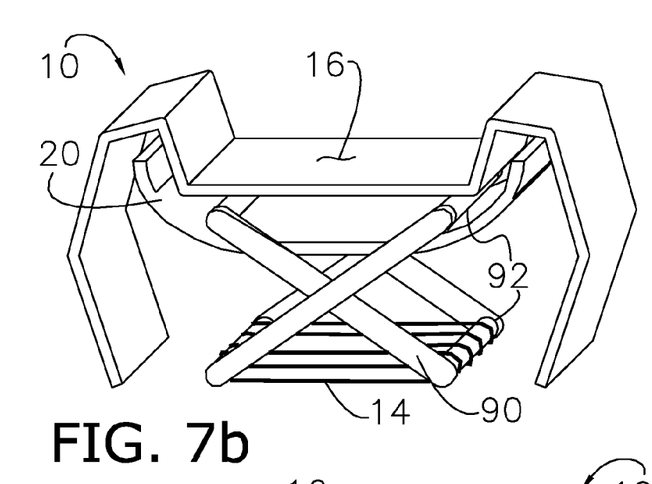
FIG. 7b is a perspective view of the bolsters shown in FIG. 7a, wherein the assembly is in a raised condition caused by activation.

It is appreciated that more complex structures may be used to effect translation. For example, and as shown in FIGS. 7a,b, the actuator 18 may include a scissor assembly 88 comprising a plurality of pivotally connected members 90, further interconnected by lateral rungs 92. The assembly 88 is manipulable between collapsed and extended conditions. The assembly 88 is pivotally connected to first and second lateral bolsters 10 preferably at the upper end of the uppermost members 90. The actuator 18 is configured to cause the assembly 88 to shift between the conditions when the element(s) 14 is activated. As shown in FIG. 7b, a preferred actuator 18 consists of a single SMA wire 14 entrained repetitively around the bottom rungs 92 of the assembly 88. Alternatively, a plurality SMA wire loops 14 may also be used. The structures 20 are caused to congruently (e.g., synchronously and equally) swing between positions as a result of shifting the assembly 88 between conditions.

Figure 8A:
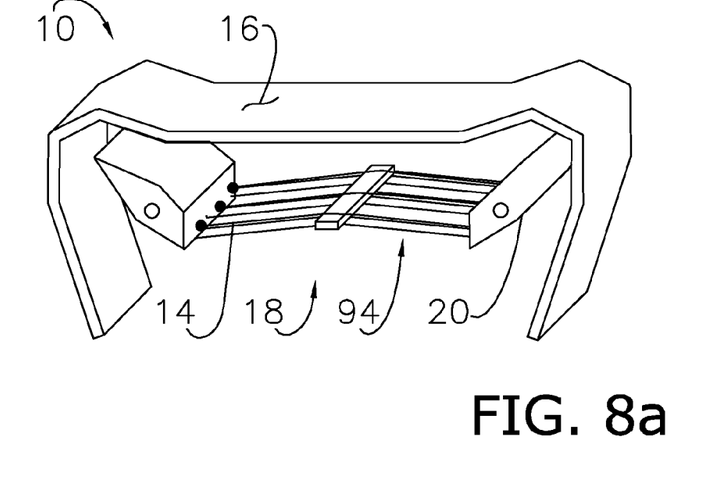
FIG. 8a is a perspective view of first and second adjustable lateral bolsters including an active material based actuator employing a folding assembly shown in a flattened and deactivated condition, in accordance with a preferred embodiment of the invention.
Figure 8B:
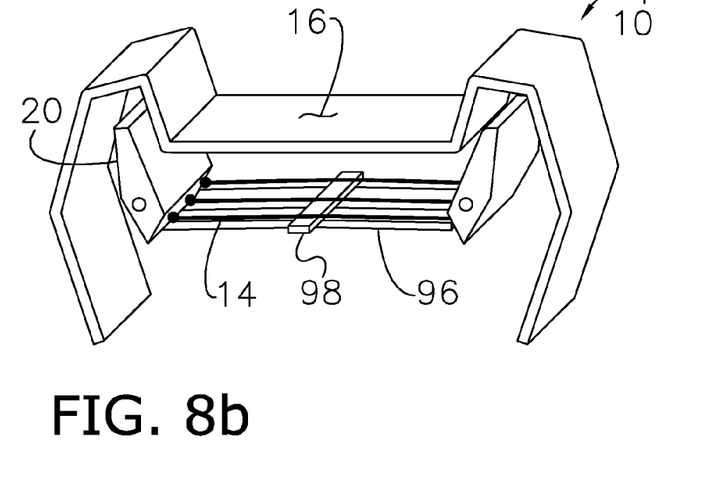
FIG. 8b is a perspective view of the bolsters shown in FIG. 8a, wherein the assembly is in a raised condition caused by activation.

Moreover, and as shown in FIGS. 8a,b, the actuator 18 may include a generally horizontally oriented folding assembly 94 that is manipulable between collapsed and extended conditions. The folding assembly 94 comprises a series of parallel slats 96 that are pivotally connected to a centrally located floating rib 98 and to the structures 20 at their distal ends. A preferred actuator 18 in this configuration consists of an SMA wire 14 coextending with and supported by each set of pivotally connected slats 96. The assembly 94 and elements 14 are cooperatively configured such that the elements 14 are configured to cause the assembly 94 to shift between the conditions when activated, and the structures 20 are caused to congruently swing between positions as a result of shifting the assembly 94 between conditions.

As previously described, to counter the actuator 18, a return mechanism (i.e., "return") 100 is preferably provided where two-way actuation is presented, and more preferably, where one-way actuation is presented. That is to say, the return mechanism 100 is drivenly coupled to the structure 20, and acts antagonistically to the actuator 18. The return mechanism 100 may be embodied by a compression, extension, leaf, and torsion spring, an elastomer, a pneumatic/hydraulic cylinder, an additional active material element, or the like. For example, in FIGS. 2, and 4, the return mechanism 100 is an extension spring connected to the bottom half of the swing arm 20. When the actuator 18 cause the arm 20 to swing upwards, the spring 100 is caused to store energy by stretching. It is appreciated that the actuation force generated by the element 14 is greater than the restoring force of the spring 100. Upon deactivation, the spring 100 overcomes the modulus of elasticity of the deactivated wire 14, such that it causes the wire 14 to stretch and the arm 20 to swing back towards the original position (FIG. 3). The superelastic strain upon the wire 14 caused by the return mechanism 100 accelerates phase transformation back to the martensitic state.

Figures 9, 10A, 10B, 11, 12:
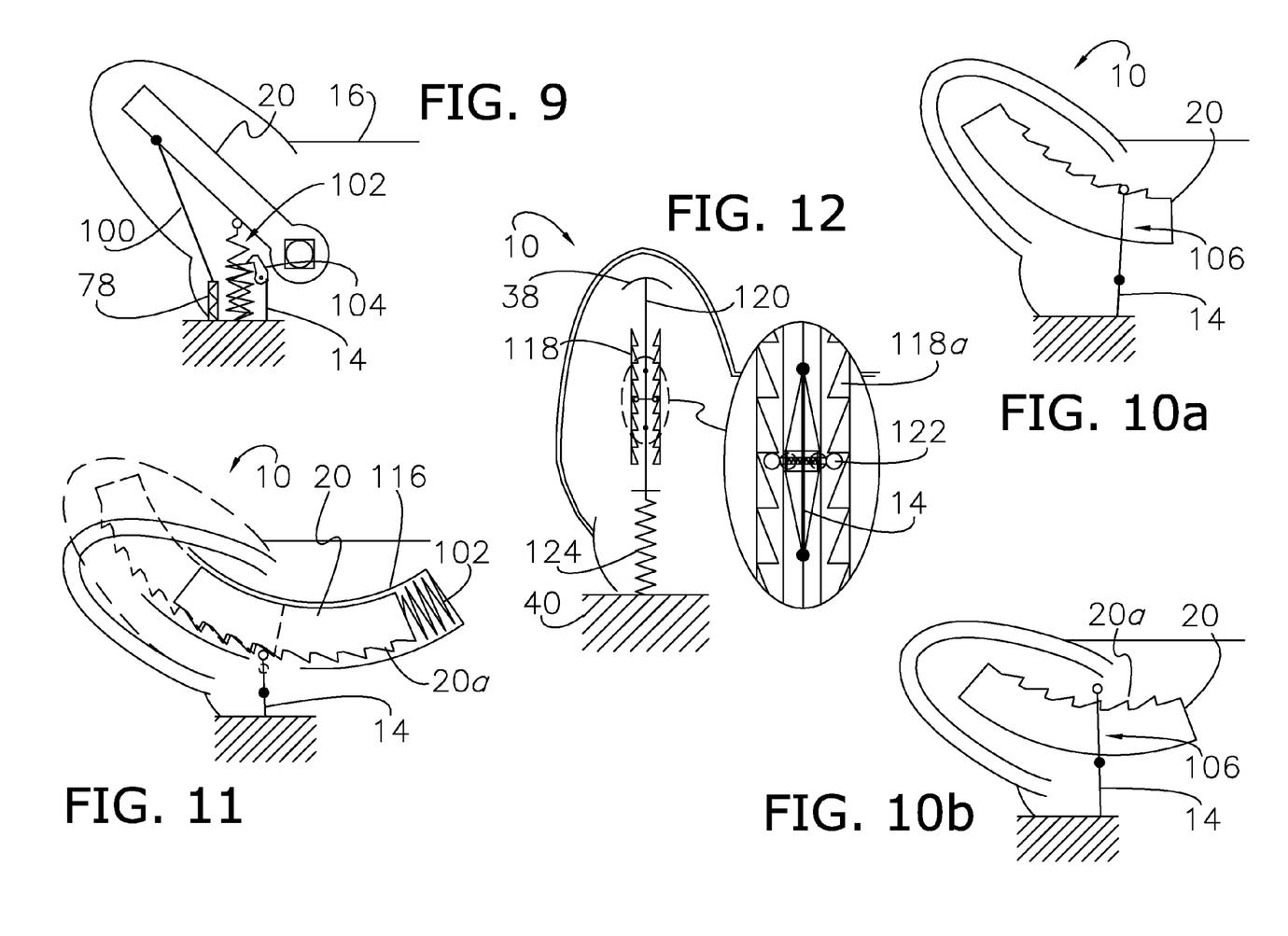
FIG. 9 is an elevation of the system shown in FIGS. 2a and 3, particularly illustrating a stored energy element intermediate a release comprising an active material element and the structure, in accordance with a preferred embodiment of the invention.
FIG. 10a is an elevation of an adjustable bolster including a ring sector structure defining a plurality of radially inner teeth, and an active material actuated latch, wherein the latch is engaged with the structure, and the bolster is in a raised condition, in accordance with a preferred embodiment of the invention.
FIG. 10b is an elevation of the bolster shown in FIG. 10a, wherein the latch is disengaged from the sector structure, so as to hold the bolster in a lowered condition.
FIG. 11 is an elevation of an adjustable bolster including a ring sector structure defining a plurality of radially outer teeth translating within a slot, and shown in both flattened (solid-line type) and raised (hidden-line type) conditions, an active material actuated latch, and a return spring biasing the structure towards the raised condition, in accordance with a preferred embodiment of the invention.
FIG. 12 is an elevation of an adjustable bolster including a vertical ratchet, moveable pusher, and biasing spring, wherein the pusher further includes, in enlarged caption view, an SMA released locking pin selectively engaging the ratchet, in accordance with a preferred embodiment of the invention.

Alternatively, it is also appreciated that the return spring 100 may be replaced by or combined with a second active material element (FIG. 9). As a preferred embodiment, the return mechanism 100 can be an SMA wire with Austenite finish temperature chosen suitably low such that it will be in its high modulus state when unstressed. When stretched, the return wire will do so "super-elastically" and exert a highly desirable nearly constant return force as compared to the linearly increasing return force exerted by standard springs.

In another example, the actuator 18 further includes a stored energy element 102 intermediately coupled to the active material element 14 and structure 20 (FIGS. 9 and 12). The stored energy element 102 is operable to release stored energy when the active material element 14 is activated, and to manipulate the structure 20, as a result of releasing the energy. For example, the stored energy element 102 may consists of a compression spring that is compressed by the structure 20 in the lower position (FIGS. 9 and 12), or a torsion or clock spring engaging and concentrically aligned with the pivot axis of the structure 20. Here, the actuator element 14 functions as a release operable to cause a biased pin or pawl 104 to disengage the spring 102 thereby freeing it to manipulate the bolster 10. In FIG. 9, the return mechanism 100 is a second SMA wire. Here, the wire 58 and spring 102 are cooperatively configured, such that the spring 102 generates a decompression force greater than the elastic modulus of the wire 58, when deactivated, but not, when activated. That is to say, the wire 58 is able to overcome the spring force when activated.

Finally, a zero-power hold latching or locking mechanism 106 is preferably moveable provided to hold the structure 20 in the manipulated position even after the actuator element 14 (or return wire 100) has been deactivated. When desired, the locking mechanism 106 is released, so that the structure 20 can be moved back to the previous position. For example, and as shown in FIG. 6, where the structure 20 defines a pivot axis, the locking mechanism 106 may include a "toothed" gear 108 fixedly coupled thereto and concentrically aligned with the axis. The gear 108 preferably presents a plurality of sloped teeth 108a each representing a separately achievable position of rotation. A pawl 110 is operable to selectively engage the gear 108, so as to prevent motion thereby. More specifically, and as shown in FIG. 6, the pawl 110 defines a sloped catch that slidingly engages the plurality of teeth 108a, so as to allow the gear 108 to turn in a first direction, and prevent motion in the other direction. An active material element 112 (e.g., SMA wire) is preferably provided and configured to cause the pawl 110 to selectively disengage the structure 20, when activated.

The preferred locking mechanism 106 further includes its own return (e.g., an extension spring, stored energy element, etc.) 114 that functions antagonistically to the disengaging element 112. The return 114 exerts a constant force upon, so as to bias the mechanism 106 towards the engaged position. Alternatively, the locking mechanism 106 may include first and second active material elements that when activated cause the mechanism 106 to engage and disengage the structure 20, respectively. Finally, in yet another alternative, a gear bar (not shown) may be utilized, wherein a two-way element 112 is configured to unlock, and then relock the mechanism 106 to the bar at a desired incremental position. More preferably, however, the bolster 10 is gradually adjustable between two extremes. As such, it is appreciated that frictional engagement may be employed in place of a toothed gear or bar.

In yet another embodiment, the toothed gear 108 and structure 20 may be functionally combined to present a ratchet, as shown in FIGS. 10a-11. More particularly, the structure 20, in this configuration, presents a ring sector defining either radially inner or outer teeth 20a. In FIGS. 10a,b, the structure 20 presents a plurality of radially inner teeth 20a, each being preferably sloped, so as to represent a separately achievable position of rotation. A latch 106 is operable to slidingly engage the teeth 20a as the structure 20 rotates in a first direction, and catches an engaged tooth at an achievable position of choice, so as to prevent motion in the opposite direction. The preferred latch 106 utilizes an active material element 14 that is configured to selectively disengage the structure 20, when deactivated. The structure 20 is moveable (via, an actuator 18, or manually) in either direction only when the latch 106 is in the disengaged condition.

In FIG. 11, a ring sector 20 freely translates within an arcuate slot 116 of matching width and radius, and defines radially outer teeth 20a. In this configuration, a stored energy element (e.g., compression spring, etc.) 102 is preferably disposed within the slot 116, so as to be caused to store energy when the structure 20 translates inwardly (in the "other" direction). Again, a preferably active material based latch 106 is configured to selectively prevent the structure 20 from rotating in the other direction and retains the energy until needed for actuation.

Finally, in a similar embodiment, a vertical ratchet 118 and pusher 120 may be manually manipulated to effect a plurality of fixed bolster heights. For example, and as shown in FIG. 12, the pusher 120 may present a planar body defining upper and lower edges corresponding to the longitudinal length of the bolster 10, an engaging shoe 38 along the upper edge, a retractable locking pin 122 interior to the upper and lower edges, and a lift handle attached to or biasing element (e.g., spring) 124 engaging the lower edge. The ratchet 118 defines opposite faces spaced to present a vertical seam within which the pusher 120 translates. A plurality of sloped teeth 118a is defined preferably on both faces, and jut into the seam. First and second opposite pins 122 are biased towards an extended position where they engage the teeth 118a. The pins 122 and teeth 118a are cooperatively configured to prevent pusher translation, depending upon the orientation of the teeth 118a, in one direction (e.g., retraction into the base 12a) when engaged. Thus, the pusher 120 can be lifted or lowered to a desired elevation by sliding the pins 122 over the sloped teeth. To release the pins 122, shape memory material actuation is utilized. For example, and as shown in enlarged caption view in FIG. 12, a single SMA wire 14 may be entrained by the locking pins 122, such that it causes the pins 122 to retract when activated. In the illustrated embodiment, it is appreciated that retraction of the pins 122 enables the biasing spring 124 to move the pusher 120 to the uppermost position.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A manipulable seat bolster adapted for use with a seat defining an exterior surface presenting a condition, and for autonomously changing the condition, said bolster comprising:
    an actuator communicatively coupled to the surface, and including an active material element operable to undergo a reversible change in fundamental property when exposed to or occluded from an activation signal;
    a signal source communicatively coupled to the element and operable to generate the signal, so as to activate the element,
    said actuator being configured to cause or enable the condition of the surface to be modified, when the element is activated; and
    a reconfigurable structure disposed within the seat, and modifiable between a plurality of structure configurations relative to the surface, wherein the condition is the geometric configuration of the surface, and each of the structure configurations causes the surface to present a different geometric configuration;
    said actuator being drivenly coupled to the structure, and operable to modify the structure so as to achieve one of the configurations, when the element is activated,
    wherein the actuator further includes an overload protector connected to the element opposite the structure, and configured to present a secondary work output path, when the element is activated and the structure is unable to be moved.

2. The bolster as claimed in claim 1, wherein the actuator further includes a stored energy element communicatively coupled to the active material element, the stored energy element is operable to release stored energy when the active material element is activated, and configured to change the condition, as a result of releasing the energy.

3. The bolster as claimed in claim 1, further comprising:
    at least one sensor communicatively coupled to the source, operable to detect a condition, and configured to selectively cause the source to activate the material element, when the condition is detected.

4. The bolster as claimed in claim 3, wherein the condition is an actual or imminent crash event.

5. The bolster as claimed in claim 3, wherein the sensor is a load cell operably positioned relative to the surface, and the condition is a minimum force applied to the surface.

6. The bolster as claimed in claim 3, wherein the condition is a minimum yaw or lateral acceleration rate.

7. The bolster as claimed in claim 1, wherein the element is a shape memory alloy wire.

8. The bolster as claimed in claim 1, further comprising:
a return mechanism drivenly coupled to the structure antagonistically to the actuator, and producing a biasing force less than the actuation force, such that the mechanism causes the structure to move to the first position when the element is deactivated and allows the actuator to drive the structure to the second position when the element is activated.

9. The bolster as claimed in claim 8, wherein the return mechanism is selected from the group consisting essentially of compression, extension, leaf, pneumatic/hydraulic and torsion springs, shape memory alloy wires operating in the martensitic mode, and shape memory alloy wires operating in the superelastic mode.

10. A manipulable seat bolster adapted for use with a seat defining an exterior surface, and for changing the geometric configuration of the surface, said bolster comprising:
a moveable structure disposed within the seat, and moveable between a plurality of positions relative to the surface, wherein each of said positions causes the surface to present a different geometric configuration; and
a locking mechanism operable to selectively engage, so as to prevent motion in at least one direction by, the structure in each of said plurality of positions, and including an active material element operable to undergo a reversible change in fundamental property when exposed to or occluded from an activation signal,
said element being configured to cause the mechanism to move to one of engaged and disengaged conditions, when activated, and said structure and mechanism being cooperatively configured such that the structure is moveable in the direction only when the mechanism is in the disengaged condition,
wherein the structure defines a pivot axis, and the mechanism includes a ratchet concentrically aligned with the axis and fixedly coupled to the structure, and a pawl configured to selectively engage the ratchet so as to prevent rotation.

11. The bolster as claimed in claim 10, wherein the structure is causable to rotate about a rotation axis and defines a plurality of sloped teeth corresponding to the plurality of positions, and each of said teeth are operable to slidingly engage the mechanism in a first direction of rotation and catch the mechanism in the other direction of rotation, so as to enable relative rotation only in the first direction and hold the structure in a selected one of the positions, when the mechanism is in the engaged condition.

* * * * *